(12) United States Patent
Shiraishi et al.

(10) Patent No.: US 11,040,451 B2
(45) Date of Patent: Jun. 22, 2021

(54) TEACHING DEVICE AND TEACHING METHOD

(71) Applicant: Seiko Epson Corporation, Tokyo (JP)

(72) Inventors: Satoshi Shiraishi, Azumino (JP); Takashi Nammoto, Azumino (JP)

(73) Assignee: Seiko Epson Corporation

( * ) Notice: Subject to any disclaimer, the term of this patent is extended or adjusted under 35 U.S.C. 154(b) by 310 days.

(21) Appl. No.: 15/935,627

(22) Filed: Mar. 26, 2018

(65) Prior Publication Data
US 2018/0281197 A1    Oct. 4, 2018

(30) Foreign Application Priority Data

Mar. 29, 2017 (JP) .............................. JP2017-064541

(51) Int. Cl.
*B25J 9/16* (2006.01)

(52) U.S. Cl.
CPC ........... *B25J 9/1697* (2013.01); *B25J 9/1669* (2013.01); *B25J 9/1687* (2013.01); *Y10S 901/03* (2013.01); *Y10S 901/47* (2013.01)

(58) Field of Classification Search
None
See application file for complete search history.

(56) References Cited

U.S. PATENT DOCUMENTS

| | | | | |
|---|---|---|---|---|
| 4,305,130 A | * | 12/1981 | Kelley | B25J 19/023 318/640 |
| 4,835,450 A | * | 5/1989 | Suzuki | B25J 9/1679 318/568.13 |
| 4,985,846 A | * | 1/1991 | Fallon | B25J 9/1697 348/86 |
| 5,249,131 A | * | 9/1993 | Kato | B65G 1/1378 700/217 |
| 5,481,652 A | * | 1/1996 | Sasaki | B25J 9/1612 700/262 |
| 5,600,760 A | * | 2/1997 | Pryor | B25J 9/1692 700/253 |
| 5,602,967 A | * | 2/1997 | Pryor | A01B 69/008 700/252 |
| 5,960,125 A | * | 9/1999 | Michael | G06T 7/80 382/151 |
| 6,304,050 B1 | * | 10/2001 | Skaar | B25J 9/1692 318/568.11 |
| 6,816,755 B2 | * | 11/2004 | Habibi | B25J 9/1697 318/568.11 |

(Continued)

FOREIGN PATENT DOCUMENTS

| | | |
|---|---|---|
| JP | 2003-236784 A | 8/2003 |
| JP | 2010-058235 A | 3/2010 |
| JP | 2016-124065 A | 7/2016 |

*Primary Examiner* — Bhavesh V Amin
(74) *Attorney, Agent, or Firm* — Harness, Dickey & Pierce, P.L.C.

(57) ABSTRACT

A teaching device includes an image acquisition unit which acquires an image including a manipulation target object which is linked to operations of an arm of a robot and a teaching position of the manipulation target object, a movement control unit which controls the arm to move the manipulation target object in the image to the teaching position, and a teaching information acquisition unit which acquires a state of the arm in a state in which the manipulation target object in the image is present at the teaching position as teaching information.

7 Claims, 9 Drawing Sheets

(56) References Cited

U.S. PATENT DOCUMENTS

| | | | |
|---|---|---|---|
| 7,177,459 B1* | 2/2007 | Watanabe | B25J 9/1697 |
| | | | 382/151 |
| 7,336,814 B2* | 2/2008 | Boca | G06K 9/32 |
| | | | 382/141 |
| 7,957,583 B2* | 6/2011 | Boca | B25J 9/1697 |
| | | | 382/154 |
| 8,095,237 B2* | 1/2012 | Habibi | B25J 9/1692 |
| | | | 700/245 |
| 8,155,789 B2* | 4/2012 | Nagatsuka | B25J 9/1656 |
| | | | 700/250 |
| 9,727,053 B2* | 8/2017 | Ito | G05B 19/42 |
| 9,902,059 B2* | 2/2018 | Sonoda | B25J 9/16 |
| 2004/0172164 A1* | 9/2004 | Habibi | G06T 1/0007 |
| | | | 700/245 |
| 2008/0154428 A1* | 6/2008 | Nagatsuka | B25J 9/1656 |
| | | | 700/258 |
| 2013/0054025 A1* | 2/2013 | Ito | B25J 9/1697 |
| | | | 700/246 |
| 2016/0059407 A1* | 3/2016 | Sonoda | B25J 9/0081 |
| | | | 700/260 |
| 2017/0182665 A1* | 6/2017 | Okuyama | B25J 9/1697 |
| 2017/0343998 A1 | 11/2017 | Takayama et al. | |
| 2018/0281197 A1* | 10/2018 | Shiraishi | B25J 9/1669 |
| 2018/0345484 A1* | 12/2018 | Miyamoto | B25J 9/0081 |
| 2019/0275678 A1* | 9/2019 | Takeuchi | B25J 9/1633 |

* cited by examiner

TEACHING DEVICE AND TEACHING METHOD

BACKGROUND

1. Technical Field

The present invention relates to a teaching device and a teaching method.

2. Related Art

When causing a robot to perform a task, often control is performed such that the task is broken down into a plurality of processes and a manipulation target object moves between a plurality of teaching positions in each step. Ordinarily, it is necessary for the teaching positions to be taught before starting the operation of the robot. A technique of using a teaching pendant (for example, refer to JP-A-2003-236784), and a technique of a teacher personally moving a robot to perform direct teaching (for example, refer to JP-A-2016-124065) are known as techniques for performing the teaching.

For the teaching using the teaching pendant, it is necessary to have an extensive knowledge of the manipulation of the teaching pendant and the movement and rotation of the robot caused by the manipulation and it is difficult for a person other than an expert to perform the teaching. For the teaching using direct teaching, it is necessary for the teacher personally to move the robot and it is difficult to perform the teaching of a heavy robot, the teaching which accompanies minute positional adjustments, and the like. In other words, in a configuration in which the user directly or indirectly moves the robot to perform the teaching, the difficulty of the teaching is high.

SUMMARY

A teaching device according to an aspect of the invention includes an image acquisition unit which acquires an image including a manipulation target object which is linked to operations of an arm of a robot and a teaching position of the manipulation target object, a movement control unit which controls the arm to move the manipulation target object in the image to the teaching position, and a teaching information acquisition unit which acquires a state of the arm in a state in which the manipulation target object in the image is present at the teaching position as teaching information.

That is, the state of the arm in a state in which movement of the manipulation target object to the teaching position is performed based on an image and the movement of the manipulation target object to the teaching position is completed is acquired as teaching information. According to this configuration, it is not necessary for the user to perform the movement of the arm through direct touching or the movement of the arm through indirect manipulation which uses a teaching pendant, and it is possible to perform the teaching automatically. Therefore, it is possible to perform the teaching in an extremely easy manner.

The teaching device may be configured such that the teaching position is defined by a position relative to a reference target object which is included in the image. According to this configuration, it is possible to specify the teaching position based on the image.

The teaching device may be configured such that the teaching device further includes an input reception unit which receives an input of a position relative to the reference target object, and the movement control unit acquires a position of the manipulation target object relative to the reference target object based on the image of the manipulation target object and the reference target object and controls the arm such that the relative position becomes the teaching position. According to this configuration, the user is capable of easily performing the teaching by inputting a position relative to the reference target object.

The teaching device may be configured such that the movement control unit detects the reference target object based on the image and causes a display to display an image in which the reference target object is emphasized. According to this configuration, by visually recognizing the display, the user is capable of determining whether or not the reference target object which serves as a reference when specifying the teaching position is accurately detected in the image.

The teaching device may be configured such that the movement control unit detects the manipulation target object based on the image and causes a display to display an image in which the manipulation target object is emphasized. According to this configuration, by visually recognizing the display, the user is capable of determining whether or not the manipulation target object which serves as a reference when determining whether or not the arm is in the state to be taught is accurately detected in the image.

The teaching device may be configured such that the image acquisition unit acquires an image in which at least a portion of a background is removed excluding the manipulation target object and the teaching position. According to this configuration, it is possible to remove parts which may serve as noise for moving the manipulation target object from the image.

The teaching device may be configured such that the movement control unit controls the arm to align the manipulation target object in the image with a target image which is present at the teaching position. According to this configuration, it is possible to move the manipulation target object to the teaching position without specifying a virtual position based on the image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a description will be given of the embodiments of the invention in the following order with reference to attached drawings. Corresponding constituent elements in the drawings will be given the same reference numerals and duplicated description thereof will be omitted.

(1) Configuration of Robot:
(2) Configuration of Teaching Device:
(3) Teaching Process:
(4) Visual Servo Process:
(5) Other Embodiments:

(1) Configuration of Robot

Figure 1:
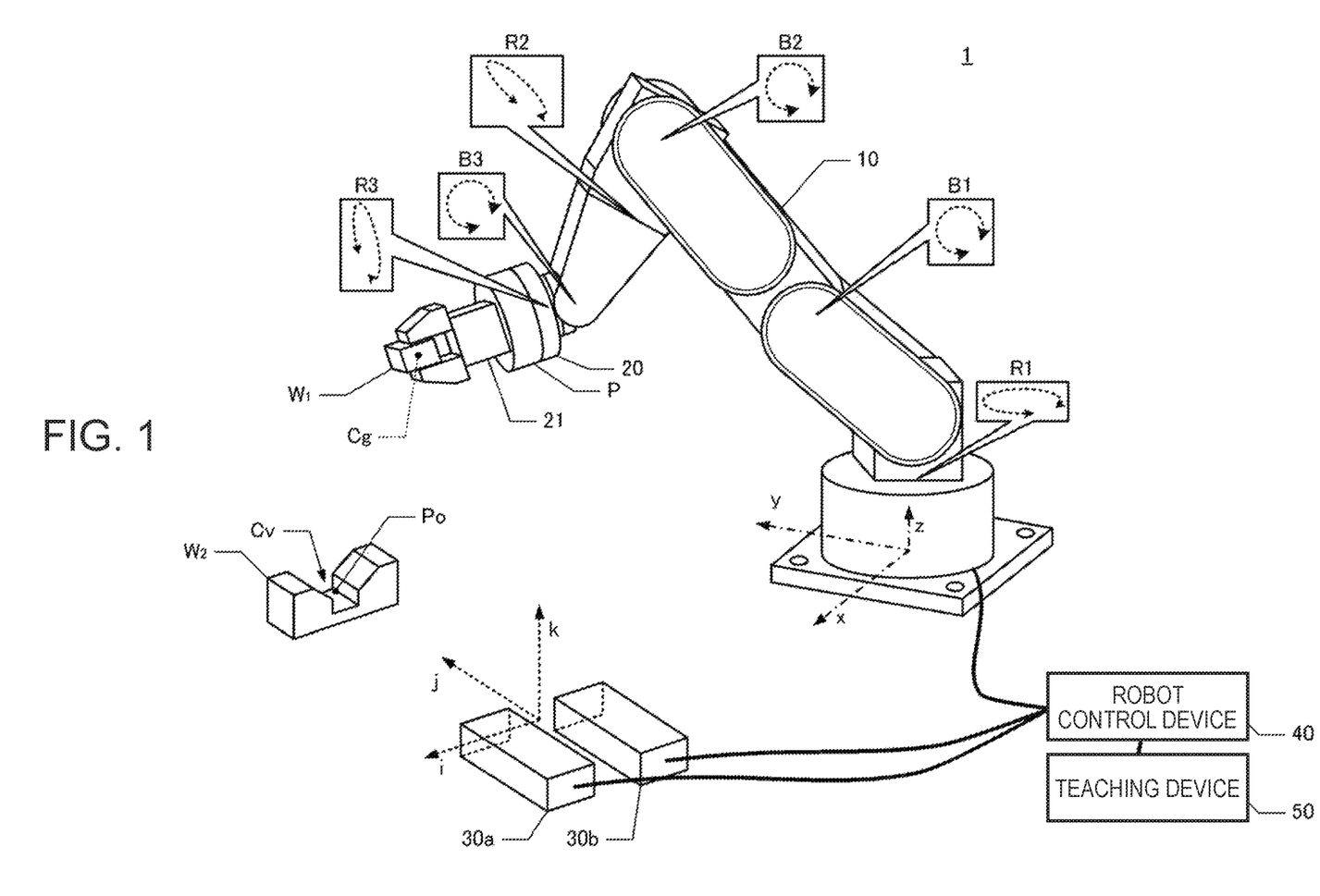
FIG. 1 is a perspective view of a robot.

FIG. 1 is a perspective view of a robot 1 of an embodiment of the invention. As illustrated in FIG. 1, the robot 1 is provided with an arm 10 and an end effector 20. The arm 10 is a six axes arm including three bending joints B1 to B3 and three torsion joints R1 to R3. The bending joints B1 to B3 are joints at which the members which configure the arm 10 rotate relative to each other centered on axes perpendicular to the length direction of the arm 10. The torsion joints R1 to R3 are joints at which the members which configure the arm 10 rotate relative to each other centered on axes of the length direction of the arm 10. The arm 10 is provided with motors (not illustrated) as drive sources for driving the bending joints B1 to B3 and the torsion joints R1 to R3. The arm 10 is provided with encoders (not illustrated) which detect values corresponding to rotation angles of each motor.

The end effector 20 is mounted to a distal end of the arm 10. By driving the six axes arm 10, the robot 1 is capable of disposing the end effector 20 at an arbitrary position in a movable range and assuming an arbitrary posture (angle). In a case in which the term "position" is simply denoted in the present specification, this may include the posture. The end effector 20 is provided with a force sensor P and a gripper 21. The force sensor P is a sensor which measures the translation force of the three axes which act on the end effector 20 and the rotational force (torque) which acts around the three axes.

The robot 1 is a general-use robot that becomes capable of various tasks through performing teaching. In the present embodiment, teaching for performing an assembly task in which a manipulation target object $W_1$ is inserted into a reference target object $W_2$ is performed, and a description will be given using a case in which the assembly task is performed as an example. In other words, the robot 1 moves the gripper 21 to a stock position of the manipulation target object $W_1$, picks up the manipulation target object $W_1$ using the gripper 21, and carries the manipulation target object $W_1$ to the space above the reference target object $W_2$. The robot 1 performs a task of inserting the manipulation target object $W_1$ into a recessed portion of the reference target object $W_2$.

In the present embodiment, the robot 1 and cameras 30a and 30b are connected to a robot control device 40. The robot 1 is controlled by the robot control device 40. The robot control device 40 is capable of executing visual servos which use the cameras 30a and 30b. In the present embodiment, it is possible to use a teaching device 50 to teach the robot 1.

The robot control device 40 is provided with an execution unit (CPU, RAM, ROM, and the like) of a program (not illustrated). The robot control device 40 is capable of performing input and output of signals via an interface (not illustrated) and is capable of acquiring the output of the force sensor P which is mounted to the end effector of the robot 1 and the output of an encoder E (not illustrated) which is embedded in the arm 10 and outputting control signals for controlling each of the motors which are provided in the arm 10. The robot control device 40 is capable of acquiring images which are output by the cameras 30a and 30b via the interface (not illustrated).

In other words, based on the images which are output by the cameras 30a and 30b, the robot control device 40 determines the target operation and is capable of performing a visual servo which controls the robot 1 to execute the target operation based on the output of the force sensor P and the encoder E. The robot control device 40 is capable of storing teaching information in a storage medium such as a ROM. In the present embodiment, the teaching information is the control information which is necessary for moving the manipulation target object $W_1$ to a teaching position which is taught in advance and the robot control device 40 is capable of controlling the robot 1 and moving the manipulation target object $W_1$ to the teaching position based on the teaching information.

In this controlling, the positions of each portion and the forces which act on each portion are defined by a plurality of coordinate systems. For example, it is possible to define the positions of and the forces acting on the arm 10 of the robot 1, the end effector 20, the gripper 21, the manipulation target object $W_1$, and the reference target object $W_2$ using a robot coordinate system (the orthogonal xyz coordinate system illustrated in FIG. 1).

When the visual servo is performed, the relative posture of the cameras 30a and 30b with respect to the robot 1 is defined. In the present embodiment, the posture of the cameras 30a and 30b with respect to the robot 1 is defined by the orientation of a camera coordinate system with respect to the robot coordinate system. Specifically, the cameras 30a and 30b are provided with an area sensor in which a plurality of lines, each including a plurality of pixels, are lined up. In the present embodiment, an orthogonal coordinate system is formed by two axes which are parallel to the line direction of the area sensor and the direction in which the lines are lined up, respectively, and one axis which is parallel to an optical axis direction of an optical system which guides light to the area sensor, and a coordinate system which uses a predetermined position (for example, a middle point or the like between the optical axes of the cameras 30a and 30b, or the like) as an origin point is defined as the camera coordinate system. In FIG. 1, the axes of the camera coordinate system are illustrated as an i axis, a j axis, and a k axis.

The camera coordinate system is fixed with respect to the cameras 30a and 30b and the origin point and the orientation of the axes change according to changes in the positions and postures of the cameras 30a and 30b. The orientation of the camera coordinate system is defined by the orientation of the axes (the i axis, the j axis, and the k axis) of the camera coordinate system with respect to the axes (the x axis, the y axis, and the z axis) of the robot coordinate system. Specifically, a state in which the x axis, the y axis, and the z axis are parallel to the i axis, the j axis, and the k axis, respectively is used as a reference, and the orientation of the cameras 30a and 30b with respect to the robot 1 is defined due to the posture of the camera coordinate system being specified by an angle u by which the camera coordinate system is rotated with respect to the z axis, an angle v by which the camera coordinate system is rotated with respect to the y axis, and an angle w by which the camera coordinate system is rotated with respect to the x axis.

In the present embodiment, the positions of the cameras 30a and 30b are also defined from the perspective of the robot 1. In other words, the position of the origin point of the camera coordinate system is defined as a coordinate in the robot coordinate system. However, in a case in which the positions of the cameras 30a and 30b from the perspective of the robot 1 are not considered in the visual servo, it is not essential to define the positions of the cameras 30a and 30b from the perspective of the robot 1 in the visual servo. As described above, in the present embodiment, the relationship between the coordinate systems is defined in advance and is recorded in the storage medium of the robot control device 40.

(2) Configuration of Teaching Device

The teaching device 50 is provided with an execution unit (CPU, RAM, ROM, and the like) of a program (not illustrated). The teaching device 50 is capable of performing input and output of signals with the robot control device 40 via an interface (not illustrated). In other words, the teaching device 50 is capable of acquiring the output images and the like from the cameras 30a and 30b from the robot control device 40, outputting instructions to the robot control device 40, and executing the visual servo of the robot 1. In the present embodiment, the teaching device 50 is provided with a function for teaching the robot 1 using the visual servo.

Figure 2:
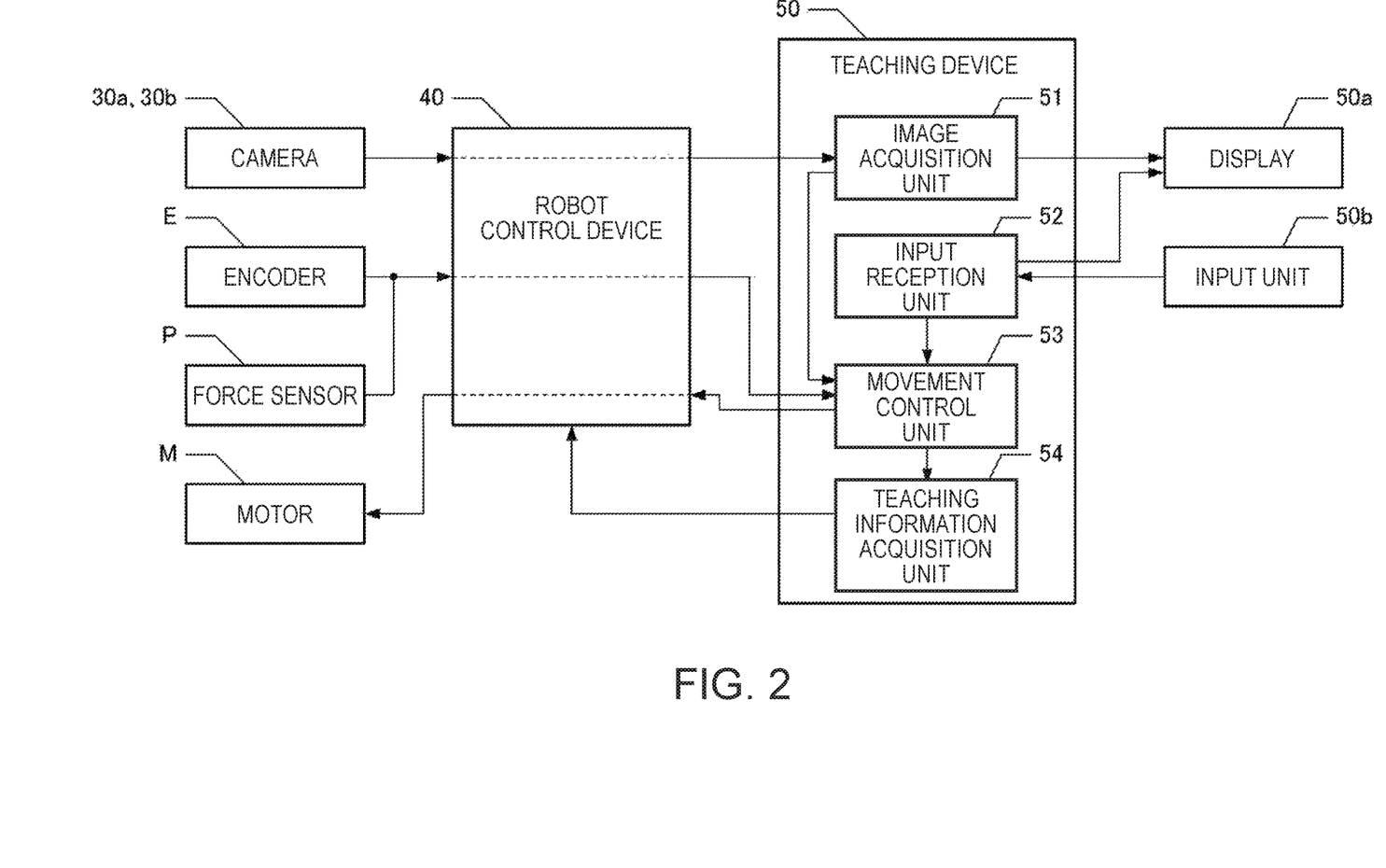
FIG. 2 is a functional block diagram of a teaching device.

FIG. 2 is a block diagram illustrating the configuration of the teaching device 50. The teaching device 50 is capable of acquiring the output images of the camera 30a and 30b and the output of the encoder E and the force sensor P and of controlling a motor M which is provided in the arm 10 by instructing the robot control device 40. In FIG. 2, the input and output of signals via the robot control device 40 is illustrated using dashed lines inside the robot control device 40. A display 50a and an input unit 50b are connected to the teaching device 50 and the teaching device 50 is capable of causing the display 50a to display an arbitrary image. The input unit 50b is provided with a keyboard, a pointing device, and the like and the teaching device 50 is capable of receiving input of a user.

The teaching device 50 functions as an image acquisition unit 51, an input reception unit 52, a movement control unit 53, and a teaching information acquisition unit 54 due to a program (not illustrated). The image acquisition unit 51 is a function of acquiring an image which includes the manipulation target object $W_1$ which is linked to the operations of the arm 10 of the robot 1 and a teaching position of the manipulation target object $W_1$. In other words, through the function of the image acquisition unit 51, the teaching device 50 instructs the robot control device 40 and acquires the images which are acquired by the cameras 30a and 30b in a state in which the manipulation target object $W_1$ and the reference target object $W_2$ are included in the visual fields of the cameras 30a and 30b.

In the present embodiment, the teaching position is a position that serves as a movement target of the manipulation target object $W_1$ and is defined by a position relative to the reference target object $W_2$. For example, in a task in which the manipulation target object $W_1$ illustrated in FIG. 1 is inserted into a recessed portion Cv of the reference target object $W_2$, a position Po to be overlapped with a center of gravity Cg of the manipulation target object $W_1$ is defined as a position viewed from the reference target object $W_2$. Therefore, when performing the teaching, the teaching device 50 uses the function of the image acquisition unit 51 to acquire the images which are obtained by the cameras 30a and 30b performing photography in a state in which a position relative to the reference target object $W_2$ (the position Po in the example illustrated in FIG. 1) and the manipulation target object $W_1$ are included in the visual field.

Using the function of the image acquisition unit 51, the teaching device 50 outputs the acquired images to the display 50a and causes the display 50a to display the images. Therefore, by visually recognizing the display 50a, the user is capable of checking whether or not a state in which the manipulation target object $W_1$ and the reference target object $W_2$ are imaged by the cameras 30a and 30b is attained.

The input reception unit 52 is a function of receiving the input of a position relative to the reference target object $W_2$. In other words, using the function of the input reception unit 52, the teaching device 50 controls the display 50a and causes the display 50a to display a user interface screen for inputting the teaching position. Using the function of the input reception unit 52, the teaching device 50 receives the input of the user to the input unit 50b and acquires the teaching position.

The teaching position may be defined by a position relative to the reference target object $W_2$, and in the present embodiment, the teaching position is specified by inputting the position and the posture of a manipulation target object coordinate system which is fixed to the manipulation target object $W_1$ in the reference target object coordinate system which is fixed to the reference target object $W_2$. Examples of the reference target object coordinate system which is fixed to the reference target object $W_2$ include an orthogonal coordinate system in which the origin point is present at the center of gravity of the reference target object $W_2$ and which includes axes parallel to the edges of the reference target object $W_2$, and examples of the manipulation target object coordinate system which is fixed to the manipulation target object $W_1$ include an orthogonal coordinate system in which the origin point is present at the center of gravity of the manipulation target object $W_1$ and which includes axes parallel to the edges of the manipulation target object $W_1$.

The teaching device 50 receives the teaching position by receiving the input of the position of the origin point of the manipulation target object coordinate system and the angles of the axes using the function of the input reception unit 52 and treating them as positions and angles in the reference target object coordinate system. According to this configuration, it is possible to easily and clearly define the teaching position.

The movement control unit 53 is a function of controlling the arm 10 to move the manipulation target object W1 in the images to the teaching position. In other words, using the function of the movement control unit 53, the teaching device 50 acquires the relative position of the manipulation target object W1 with respect to the reference target object W2 based on the images of the manipulation target object W1 and the reference target object W2 and controls the arm 10 such that the relative position becomes the teaching position. In other words, the teaching device 50 specifies an image of the manipulation target object W1 and an image of the reference target object W2 using template matching or the like from the images which are acquired using the function of the image acquisition unit 51. The teaching device 50 specifies the positions (and postures) of the manipulation target object W1 and the reference target object W2 in the camera coordinate system based on the specified images. It is possible to realize the specification of the positions (and postures) using a configuration or the like which is associated with the positions (and postures) with respect to a template, for example.

When the positions (and postures) of the manipulation target object W1 and the reference target object W2 are specified in the camera coordinate system, the teaching device 50 specifies the relative position of the manipulation target object W1 with respect to the reference target object W2 based on the relationship with the coordinate system and compares the relative position with the teaching position. In a case in which both differ, the teaching device 50 moves the robot 1. In other words, the teaching device 50 specifies the current position (and posture) of the arm 10 based on the output of the encoder E and specifies the control target for micro-movement to cause the manipulation target object W1 to approach the teaching position. The teaching device 50 outputs the control target to the robot control device 40 and controls the robot 1 to realize the control target. When the teaching device 50 repeats the above-described process, eventually, the manipulation target object W1 in the image will reach the teaching position.

According to this configuration, it is possible to control the robot 1 such that the manipulation target object W1 moves to the teaching position which is instructed through a user using the input unit 50b and it is possible to set the robot 1 to a state to be taught without using a teaching pendant or performing direct teaching. Since the user is capable of designating the teaching position and performing the teaching by only inputting a position relative to the reference target object W2 using the input unit 50b, it is possible to easily perform trial and error.

The teaching information acquisition unit 54 is a function of acquiring the state of the arm 10 as teaching information in a state in which the manipulation target object W1 in the images is present at the teaching position. In other words, when the manipulation target object W1 in the images reaches the teaching position, the teaching device 50 acquires the output value of the encoder E via the robot control device 40 and acquires the angle of each arm 10 to realize the state in which the manipulation target object W1 is present at the teaching position. The teaching device 50 outputs information indicating the angle of each arm 10 to the robot control device 40 as the teaching information. The robot control device 40 records the teaching information in the ROM (not illustrated) or the like. When the teaching information is recorded, the robot control device 40 is capable of causing the robot 1 to execute the task of moving the manipulation target object W1 to the teaching position indicated by the teaching information. The teaching information may be saved automatically in the ROM (not illustrated) or the like, may be saved after confirmation of the positions and postures of the robot 1 by the user or the like, and it is possible to adopt various configurations.

According to this configuration, it is not necessary for the user to perform the movement of the arm 10 through the user personally directly touching the arm 10 or the movement of the arm 10 through indirect manipulation which uses a teaching pendant. The user is capable of automatically performing the teaching by only inputting the teaching position using the input unit 50b. Therefore, it is possible to perform the teaching in an extremely easy manner.

(3) Teaching Process

Figure 3:
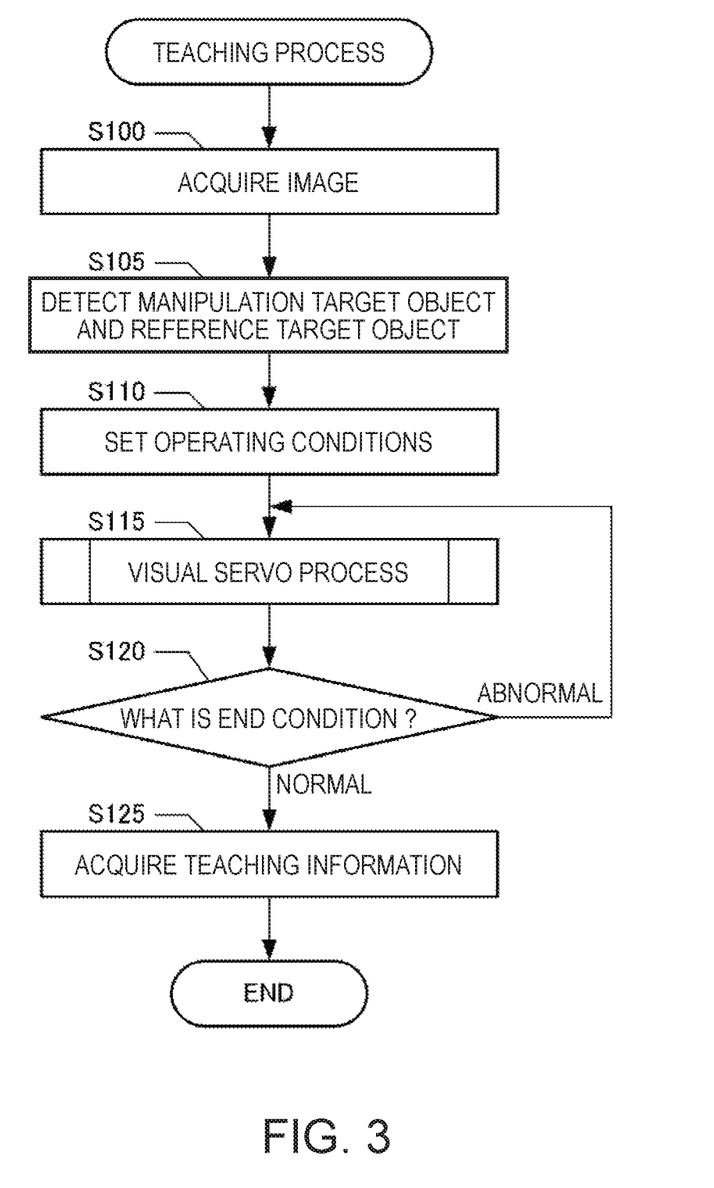
FIG. 3 is a flowchart of a teaching process.

Next a detailed description will be given of the teaching process which is executed by the teaching device 50 following the flowchart illustrated in FIG. 3. When the teaching device 50 is started up, the teaching device 50 controls the display 50a using the function of the input reception unit 52 and causes the user interface for the teaching process to be displayed on the display 50a.

Figure 4:
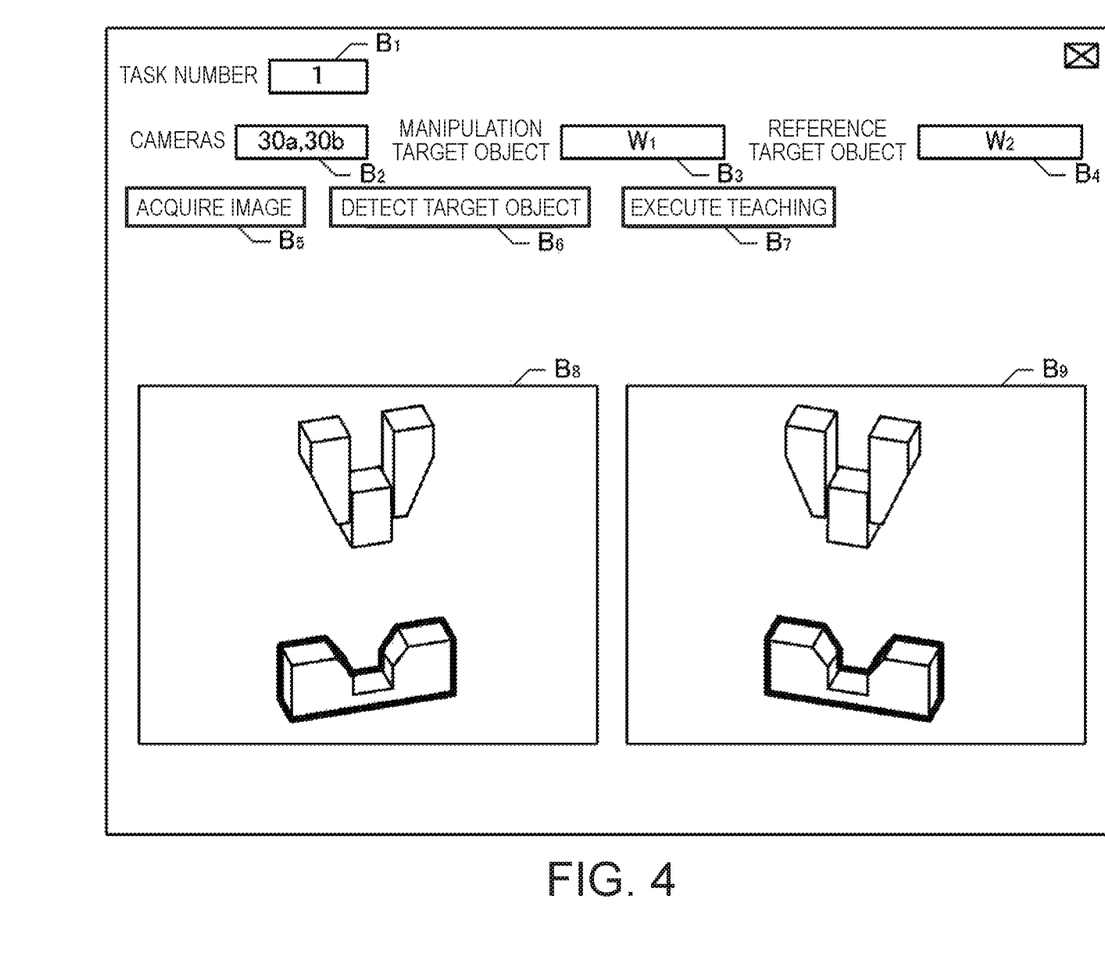
FIG. 4 is a diagram illustrating an example of a user interface.

FIG. 4 is a diagram illustrating an example of a user interface. In the user interface illustrated in FIG. 4, designation buttons $B_1$ to $B_4$ of a task number, cameras, a manipulation target object, and a reference target object are provided and it is possible to designate the task number, the cameras, the manipulation target object, and the reference target object using the designation boxes. In other words, by manipulating the input unit 50b, the user is capable of designating the task number with a numerical value, is capable of designating at least one of the cameras 30a and 30b as the cameras to be used in the teaching, and is capable of designating the manipulation target object and the reference target object. In the example illustrated in FIG. 4, the manipulation target object $W_1$ and the reference target object $W_2$ are designated in FIG. 1.

In the user interface illustrated in FIG. 4, buttons $B_5$ to $B_7$ for instructing image acquisition, target object detection, and teaching execution are further provided. In the user interface illustrated in FIG. 4, a display portion B8 of the image which is captured by the camera 30a and a display portion B9 of the image which is captured by the camera 30b are provided.

When the user instructs the image acquisition using the button $B_5$ in a state in which the task number, the cameras, the manipulation target object, and the reference target object are designated using the designation boxes, the teaching device 50 acquires images through the process of the image acquisition unit 51 (step S100). In other words, captured images of the cameras which are designated by the designation box $B_2$ are acquired. When the images are acquired, the teaching device 50 controls the display 50a and causes the captured images of the designated cameras to be displayed on the display portions B8 and B9 of the user interface.

If the user visually recognizes the display portions B8 and B9 in this state, the user is capable of checking whether or not the manipulation target object $W_1$ and the reference target object $W_2$ are included in the visual fields of the cameras 30a and 30b. If the manipulation target object $W_1$ and the reference target object $W_2$ are not included in the visual fields of the cameras 30a and 30b, the user is capable of redoing until the manipulation target object $W_1$ and the reference target object $W_2$ are included in the visual fields of the cameras 30a and 30b by performing control of the robot 1, movement of the reference target object $W_2$, and the like. Naturally, the state in which the manipulation target object $W_1$ and the reference target object $W_2$ are included in the visual fields of the cameras 30a and 30b may be automatically achieved through the control of the robot 1 and the analysis of the images.

When the user instructs the detection of the target object using the button $B_6$ in a state in which the manipulation target object $W_1$ and the reference target object $W_2$ are included in the visual fields of the cameras 30a and 30b, the teaching device 50 detects the manipulation target object $W_1$ and the reference target object $W_2$ using the function of the movement control unit 53 (step S105). In other words, the teaching device 50 detects the manipulation target object $W_1$ and the reference target object $W_2$ in the images by acquiring a template image which is recorded on a ROM (not illustrated) or the like and performing a template matching process.

When the detection is appropriately performed, the teaching device 50 specifies the positions and the postures of the manipulation target object $W_1$ and the reference target object $W_2$ based on a template image. When the reference target object $W_2$ is detected, the teaching device 50 causes the display 50a to display an image in which the reference target object $W_2$ is emphasized using a process of the movement control unit 53. In the present embodiment, a configuration is adopted in which an outline (an outermost circumferential edge) of the image of the reference target object $W_2$ is emphasized and illustrated, and in FIG. 4, a state is illustrated in which the outline of the reference target object $W_2$ is emphasized by a thick line. Naturally, it is possible to adopt various configurations in addition to that in which emphasis is used, and a configuration in which the outline is displayed using a specific color or the like may be adopted.

The emphasis is not displayed at an appropriate position in a state in which the detection of the reference target object $W_2$ fails or in a state in which the reference target object $W_2$ is not appropriately detected. Therefore, according to this configuration, by visually recognizing the display 50a, the user is capable of determining whether or not the reference target object $W_2$ which serves as a reference when specifying the teaching position is accurately detected in the image.

Next, the teaching device 50 sets the operating conditions using the function of the movement control unit 53 (step S110). In the present embodiment, the operating conditions are a normal end condition and an abnormal end condition of the visual servo operation and the teaching position, and the information indicating the operating conditions is stored in a ROM or the like. In the present embodiment, the end condition is predetermined. However, the teaching position can be input by the user. Naturally, the end condition may be possible to define by the user.

Figure 5:
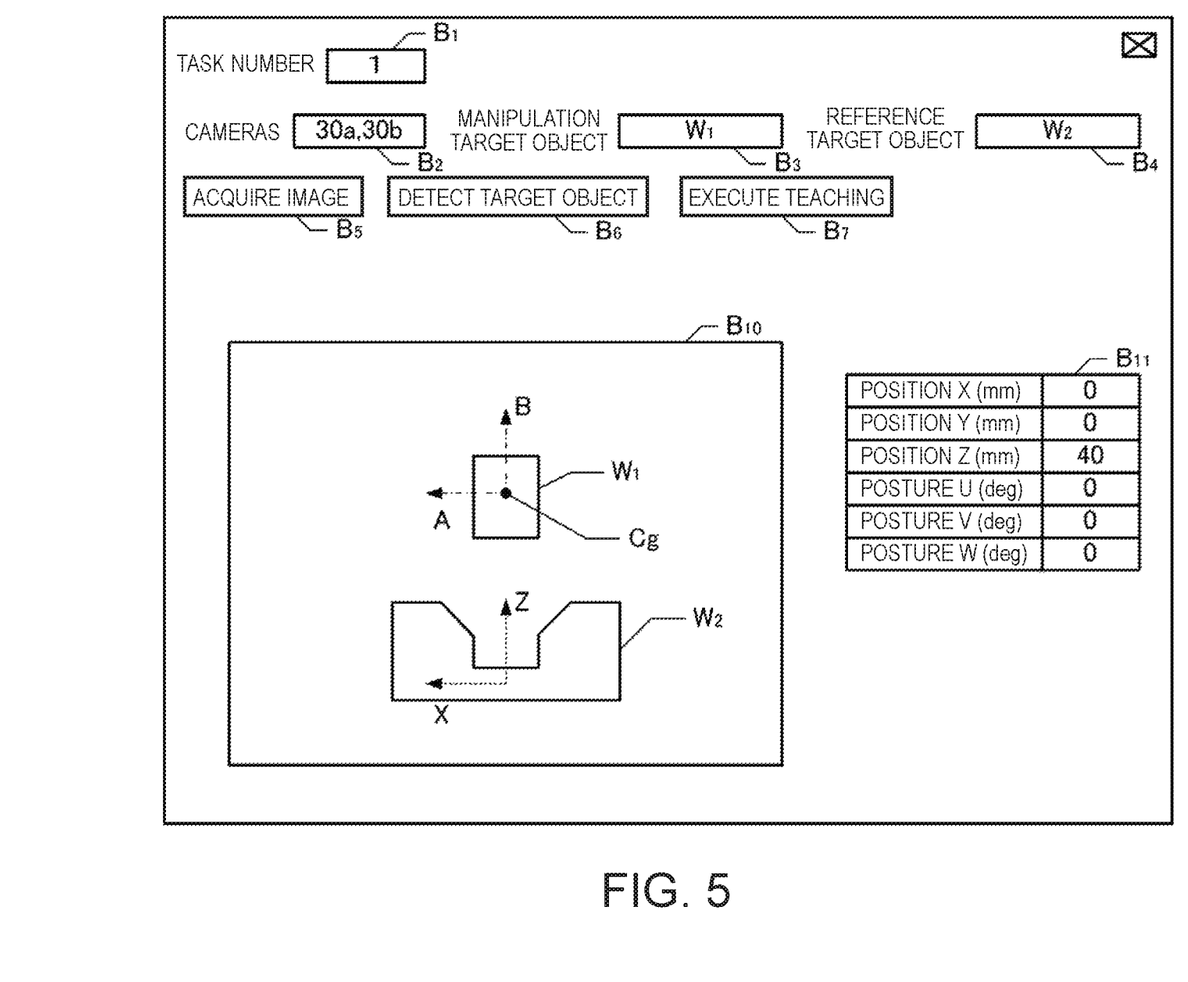
FIG. 5 is a diagram illustrating an example of a user interface.

In the inputting of the teaching position, the teaching device 50 controls the display 50a using the function of the input reception unit 52 and causes the user interface for inputting the teaching position to be displayed on the display 50a. FIG. 5 illustrates an example of the user interface for inputting the teaching position. In the example illustrated in FIG. 5, the display portions B8 and B9 of the user interface illustrated in FIG. 4 are replaced by a display portion $B_{10}$ and a designation box $B_{11}$.

A three-dimensional model of the manipulation target object $W_1$ and the reference target object $W_2$ in the reference target object coordinate system is displayed in the display portion $B_{10}$ (in FIG. 5, the target objects are schematically illustrated). In other words, the teaching device 50 stores data depicting a three-dimensional model of the manipulation target object $W_1$ and the reference target object $W_2$ in a recording medium such as a ROM. The origin point and the directions of the axes of the reference target object coordinate system are fixed with respect to the reference target object $W_2$ and the axes of the reference target object coordinate system are displayed together with the three-dimensional model of the reference target object $W_2$ on the display portion $B_{10}$. In FIG. 5, two axes (the X axis and the Z axis) of the reference target object coordinate system are in a visually recognizable state and the two axes are illustrated using dashed lines.

The origin point and the directions of the axes of the manipulation target object coordinate system are fixed with respect to the manipulation target object $W_1$ and the axes of the manipulation target object coordinate system are displayed together with the three-dimensional model of the manipulation target object $W_1$ on the display portion $B_{10}$. In FIG. 5, two axes (the A axis and the B axis) of the manipulation target object coordinate system are in a visually recognizable state and the two axes are illustrated using dot-dash lines. The manipulation target object coordinate system in the present embodiment is the coordinate system in which the center of gravity of the manipulation target object $W_1$ is present. However, another position may be the origin point.

In the designation box $B_{11}$, the position and the posture of the manipulation target object coordinate system can be designated as a position and a posture in the reference target object coordinate system. In other words, the positions X, Y, and Z which are indicated in the designation box $B_{11}$ are values representing the position of the origin point of the manipulation target object coordinate system in the reference target object coordinate system and are defined as positions on each axial direction of the X, Y, and Z axes which configure the reference target object coordinate system. The postures U, V, and W which are indicated in the designation box $B_{11}$ are values which represent a posture of the axes (the A axis, the B axis, and the C axis) of the manipulation target object coordinate system as angles with respect to the axes (the X axis, the Y axis, and the Z axis) of the reference target object coordinate system.

In the present embodiment, the teaching device 50 changes the image of the manipulation target object $W_1$ and the manipulation target object coordinate system according to the values which are input in the designation box $B_{11}$ using the function of the input reception unit 52. In other words, in the example illustrated in FIG. 5, since only the position Z is 40 and the other values are 0 in the designation box $B_{11}$, the center of gravity Cg of the manipulation target object $W_1$ is a position which is separated from the origin point of the reference target object coordinate system by a distance of 40 in the Z axis direction, and the center of gravity Cg and the origin point of the reference target object coordinate system align in the X axis direction and the Y axis direction. The axes of the reference target object coordinate system are parallel to the axes of the manipulation target object coordinate system. When another value, for example, the posture U is input, an image of a state in which the A axis is inclined with respect to the X axis according to an input value is rendered.

According to this configuration, the user is capable of inputting numerical values to the designation box $B_{11}$ and inputting the teaching position while moving the image of the manipulation target object $W_1$ on the display portion $B_{10}$. The display content of the display portion $B_{10}$ illustrated in FIG. 5 is an example and the inclination states of the target objects may be displayed by the manipulation of a pointing device or the like, and the position and the posture of the manipulation target object $W_1$ may be input by the manipulation of a pointing device or the like.

The end condition which constitutes one of the operating conditions may be various conditions, and examples of a normal end condition include a difference between the relative position of the manipulation target object $W_1$ with respect to the reference target object $W_2$ which is specified based on the image and the teaching position which is input by the user being less than or equal to a threshold. Examples of an abnormal end condition include any one or combination of a cumulative movement amount of the manipulation target object $W_1$ after the starting of the teaching process being greater than or equal to a threshold, an output value of the force sensor P being greater than or equal to a threshold, and detection failure or timing out of the detection of either or both of the manipulation target object $W_1$ and the reference target object $W_2$.

Next, the teaching device 50 executes the visual servo process using the function of the movement control unit 53 (step S115). In other words, the teaching device 50 acquires captured images of the cameras which are designated by the designation box $B_2$, and based on the captured image, performs a process which instructs the robot control device 40, causes the robot control device 40 to control the arm 10, and causes the manipulation target object $W_1$ to move to the teaching position. The details of the visual servo process will be described later.

In a case in which the visual servo ends normally, or in a case in which the visual servo process ends abnormally, the teaching device 50 determines whether the end condition is the abnormal end condition or the normal end condition using the function of the movement control unit 53 (step S120). In a case in which it is determined that the end condition is the abnormal end condition in step S120, the teaching device 50 repeats the processes of step S115 onward.

In a case in which it is determined that the end condition is the normal end condition in step S120, the teaching device 50 acquires the teaching information using the function of the teaching information acquisition unit 54 (step S125). In other words, the teaching device 50 acquires the output value of the encoder E via the robot control device 40, acquires the information indicating the angle of each of the arms 10 as the teaching information, and outputs the teaching information to the robot control device 40.

(4) Visual Servo Process

Figure 6:
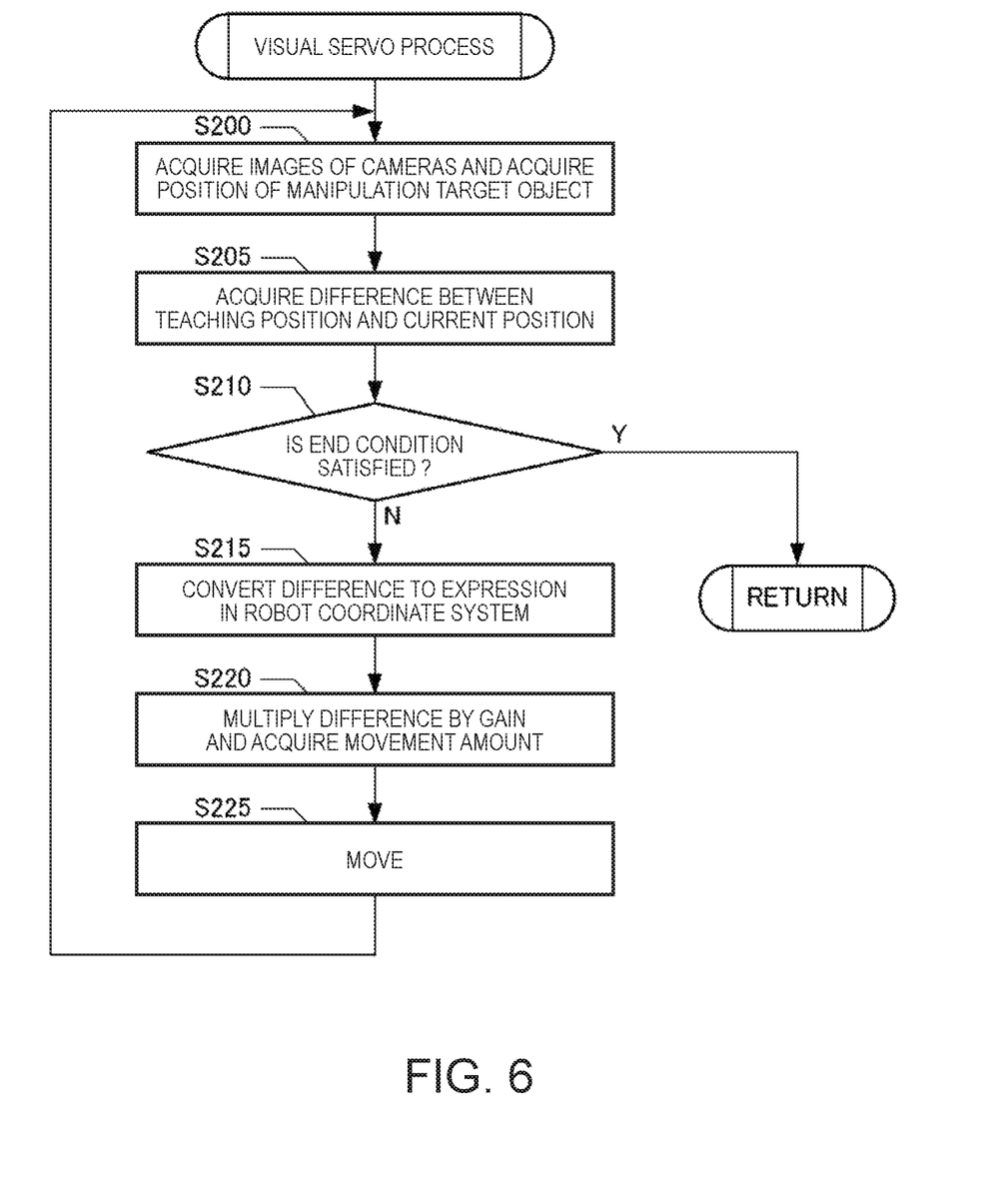
FIG. 6 is a flowchart of a visual servo process.

Next, a detailed description will be given of the visual servo process of step S115. FIG. 6 is a flowchart of a visual servo process. In the present embodiment, the visual servo process is executed in a state in which the manipulation target object $W_1$ and the reference target object $W_2$ are included in the visual fields of the cameras 30a and 30b. In the visual servo process, the teaching device 50 acquires the images of the cameras and acquires the position of the manipulation target object $W_1$ (step S200). In other words, the teaching device 50 acquires the images which are output by the cameras 30a and 30b.

Figure 7:
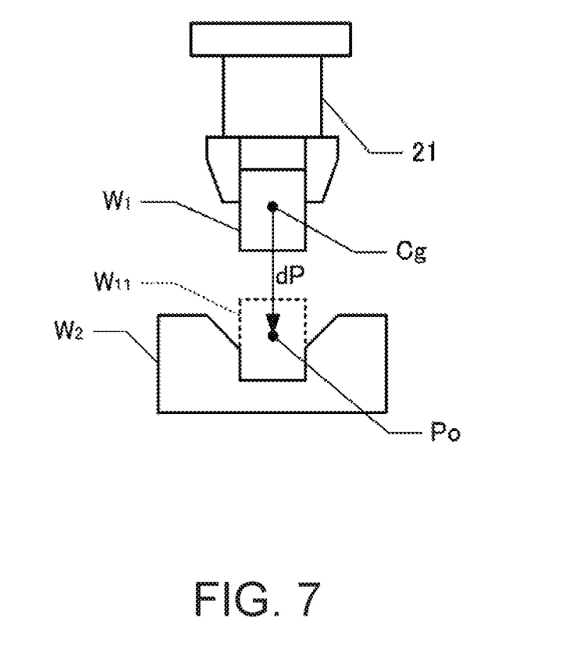
FIG. 7 is a diagram illustrating an example of the visual servo.

The teaching device 50 performs feature extraction and analysis such as pattern matching on the images and specifies the position and the posture of the manipulation target object $W_1$. As in the present embodiment, in a case in which there are greater than or equal to two cameras 30a and 30b, the distance between the manipulation target object $W_1$ and the cameras may be specified using the parallax between the cameras and the position and the posture of the manipulation target object $W_1$ may be specified based on the distance. As a result of the analysis, a state is attained in which the position and the posture of the manipulation target object $W_1$ in the camera coordinate system are specified. FIG. 7 is a diagram schematically illustrating the target objects in an image which is captured by the camera 30a or 30b, and when step S200 is performed, the position and the posture of the center of gravity Cg are specified as the position and the posture of the manipulation target object $W_1$.

Figure 8:
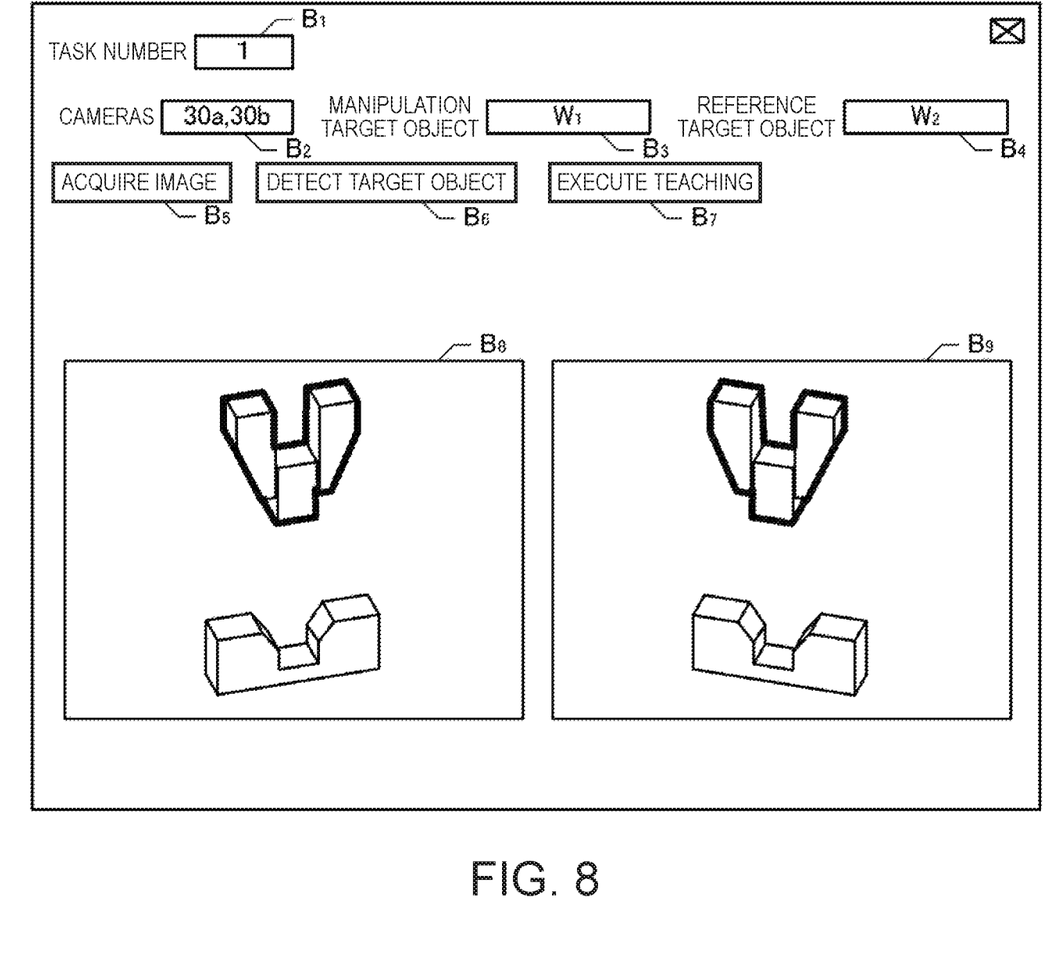
FIG. 8 is a diagram illustrating an example of a user interface.

In step S200, the teaching device 50 detects the manipulation target object $W_1$ based on the images and causes the display 50a to display images in which the manipulation target object $W_1$ is emphasized. In the present embodiment, a configuration is adopted in which the outline (the outermost circumferential edge) of the image of the manipulation target object $W_1$ is emphasized and illustrated. FIG. 8 illustrates an example of the user interface during the execution of the visual servo and the emphasized display is performed on the display portions B8 and B9 of the user interface. In this example, a state is illustrated in which the outline of the manipulation target object $W_1$ is emphasized with a thick line. Naturally, it is possible to adopt various configurations in addition to that in which emphasis is used, and a configuration in which the outline is displayed using a specific color or the like may be adopted.

The emphasis is not displayed at an appropriate position in a state in which the detection of the manipulation target object $W_1$ fails or a state in which the manipulation target object $W_1$ is not appropriately detected. Therefore, according to this configuration, by visually recognizing the display 50a, the user is capable of determining whether or not the manipulation target object $W_1$ which serves as a reference of whether or not a teachable state is attained is accurately detected in the image.

Next, the teaching device 50 acquires the difference between the teaching position and the current position (step S205). In other words, the teaching device 50 performs the feature extraction and the analysis such as pattern matching on the images and specifies the position and the posture of the reference target object $W_2$. Even in this case, in a case in which there are greater than or equal to two cameras 30a and 30b, the distance between the manipulation target object $W_1$ and the cameras may be specified using the parallax between the cameras and the position and the posture of the manipulation target object $W_1$ may be specified based on the distance. As a result of the analysis, a state is attained in which the position and the posture of the reference target object $W_2$ in the camera coordinate system are specified.

The teaching device 50 specifies the positions and the postures of the reference target object $W_2$ and the manipulation target object $W_1$ in the reference target object coordinate system based on the position and the posture of reference target object $W_2$. In other words, the teaching device 50 converts the positions and the postures in the camera coordinate system to positions and postures in the reference target object coordinate system. The teaching position is defined as a position relative to the reference target object $W_2$, that is, an origin position and axial directions of the manipulation target object coordinate system in the reference target object coordinate system which is fixed to the reference target object $W_2$.

The teaching device 50 compares the position and the posture of the center of gravity Cg of the current manipulation target object $W_1$ which is specified in step S200 to the position and the posture of the teaching position (the origin position and the axial directions in the manipulation target object coordinate system) and acquires the difference. In FIG. 7, the position and posture of the manipulation target object $W_1$ in a state in which the manipulation target object $W_1$ is disposed at the teaching position is illustrated using the dashed line (reference numeral $W_{11}$) and the teaching position is the position Po and the posture of the center of gravity Cg in the state (where the difference in the posture in the example illustrated in FIG. 7 is 0 (that is, it is not necessary to change the posture)). The difference in the position is a vector dP. Hereinafter, a description will be given of this example. However, there is no fundamental difference in the control even if the difference in the posture is limited.

Next, the teaching device 50 determines whether or not the end condition is satisfied (step S210). In other words, in a case in which the difference which is acquired in step S205 is less than or equal to a threshold, for example, in a case in which the difference is 0, the teaching device 50 determines that the normal end condition is satisfied. When a predetermined abnormal end condition such as the cumulative movement amount of the manipulation target object $W_1$ after the starting of the teaching process being greater than or equal to a threshold is satisfied, the teaching device 50 determines that the abnormal end condition is satisfied. In step S210, in a case in which the end condition is satisfied, the teaching device 50 ends the visual servo process. The threshold which is compared to the difference may be various values, may be a fixed value, and may be set by the user. If the value of the difference is set to a large value, the time until convergence is shortened.

Meanwhile, in step S210, in a case in which it is not determined that the end condition is satisfied, the teaching device 50 converts the difference which is acquired in step S205 from an expression in the reference target object coordinate system to an expression in the robot target object coordinate system (step S215). In other words, in the present embodiment, the posture of the cameras 30a and 30b with respect to the robot 1 is defined by the orientation of the camera coordinate system with respect to the robot coordinate system, and the correspondence relationship between the camera coordinate system and the reference target object coordinate system is acquired by the position and the posture of the reference target object $W_2$ being specified in step S205. Therefore, the teaching device 50 converts the difference to an expression in the robot coordinate system based on the correspondence relationship of the coordinate systems. If the example illustrated in FIG. 7 is adopted, a positional change corresponding to the vector dP which is the difference in the reference target object coordinate system is specified in the robot coordinate system (the xyz coordinate system illustrated in FIG. 1).

Next, the teaching device 50 multiplies the difference which is acquired in step S215 by a gain and acquires the movement amount (step S220). In other words, in the present embodiment, a configuration is adopted in which control of moving the center of gravity Cg of the manipulation target object $W_1$ gradually toward the teaching position by repeating minute movements is repeated. Therefore, the robot 1 is configured to gradually solve the difference by multiplying the difference by a gain (<1) and performing a task of inserting the manipulation target object $W_1$ into the recessed portion of the reference target object $W_2$.

When the movement amount is acquired by multiplying the difference by a gain, the teaching device 50 instructs the robot control device 40 and moves the robot 1 by the movement amount (step S225). In other words, the teaching device 50 specifies the position of the center of gravity Cg in the robot coordinate system after the robot 1 is moved by the movement amount and causes the robot control device 40 to execute positional control in which the position of the center of gravity Cg is set to the target position. When the movement is performed, the teaching device 50 repeats the processes of step S200 onward. As a result, the manipulation target object $W_1$ gradually approaches the teaching position and, finally, the manipulation target object $W_1$ is inserted into the recessed portion of the reference target object $W_2$.

(5) Other Embodiments

The embodiment is an example for embodying the invention and it is possible to adopt various other embodiments. For example, the teaching device may be embedded in a robot control device or a robot, and the teaching device may be provided at a different location from the installation location of the robot, for example, in an external server or the like. The teaching device may be configured to control a plurality of robots. The teaching device may be distributed and disposed in a plurality of apparatuses. For example, a portion of the teaching device may be embedded in the robot and another portion of the teaching device may be disposed in a server or the like which is external to the robot. A portion of the configuration of the embodiment may be omitted, and the procedure of the process may be changed or omitted.

The arm may move and the posture may be configured to change relative to the installation position of the robot, and the number of degrees of freedom (the number of movable axes or the like) is optional. Various configurations may be adopted for the robot, and the robot may be an orthogonal robot, a horizontal multi-jointed robot, a vertical multi-jointed robot, a double-armed robot, or the like. Naturally, various configurations may be adopted for the number of axes, the number of arms, the configuration of the end effector, and the like.

In the embodiment, the robot is capable of executing the visual servo based on the captured images of the cameras 30a and 30b. However, during the operation of the robot, a configuration may be adopted in which the cameras 30a and 30b are not used. In other words, a configuration may be adopted in which although the captured images of the cameras 30a and 30b are used in the teaching, the cameras 30a and 30b are not used during the operation of the robot after the teaching.

The teaching device 50 acquires the images and the like which are output by the cameras 30a and 30b via the robot control device 40. However, naturally, the teaching device 50 may be connected to the cameras 30a and 30b and the robot 1 and the acquisition of the output images, the control of the robot 1, and the like may be directly performed.

The image acquisition unit may be capable of acquiring an image which includes the manipulation target object which is linked to the operations of the arm of the robot and a teaching position of the manipulation target object. In other words, it is sufficient to be able to acquire the images which are the basis for teaching the position of the manipulation target object using the visual servo. With respect to the cameras which capture the images, two cameras may be used as in the embodiment, one camera may be used, and various other configurations may be used. The fixed positions of the cameras are not limited to the configuration of the embodiment, and, for example, the cameras may be attached to the robot.

The manipulation target object may be an object which is linked to the operations of the arm and with which the state of the arm is taught in a case in which the object is present at a specific position. Therefore, as described above, the target object which is ascertained by the robot may be the manipulation target object, a portion of the end effector of the robot (for example, the distal end portion of a manipulator) may be the manipulation target object, and various grids may be adopted.

The teaching position of the manipulation target object is a position at which the manipulation target object is to be disposed when teaching the state of the arm. As described above, the teaching position may be a state which is unrelated to the reference target object (for example, a specific position of the working space is specified in the robot coordinate system or the like). In a case in which the teaching position is defined as a position at a specified distance from the object or the like instead of the surface of the object, there is a case in which the manipulation target object is not present and only space is present at the teaching position before the teaching. Even in this case, an image including at least the teaching position is acquired such that the image acquisition unit can determine whether or not the manipulation target object moves to the teaching position.

The movement control unit may be capable of controlling the arm to move the manipulation target object in the image to the teaching position. In other words, the movement control unit may be capable of specifying the correspondence relationship between the manipulation target object and the teaching position based on the image and executing the visual servo which performs feedback control such that the relative positional difference between the manipulation target object which is specified from the image and the teaching position is effectively lost.

It is possible to adopt various configurations for the configuration for moving the manipulation target object to the teaching position. For example, the manipulation target object may be moved to the teaching position by specifying the manipulation target object and the teaching position in a virtual three-dimensional space based on an image and specifying the operations of the arm which changes position in the three-dimensional space. For example, a configuration may be adopted in which the arm is moved based on the image and the arm is moved until it is possible to confirm that the manipulation target object reaches the teaching position using an image. The movement direction of the arm may be specified based on the image, and it may be learned which direction in which to move the arm based on an image using machine learning or the like.

The teaching information acquisition unit may be capable of acquiring the state of the arm as teaching information in a state in which the manipulation target object in the image is present at the teaching position. In other words, in a case in which the fact that the manipulation target object reaches the teaching position is specified based on the image, as long as the state of the arm is reproduced, it is possible to move the manipulation target object from another position to the teaching position. Therefore, it is possible to use the state of the arm as the teaching information.

The teaching information may be defined in various manners. In other words, the teaching information may be defined according to elements to be reproduced in the process of operating the robot later. For example, in a case in which the state of the arm in a state in which the manipulation target object is present at the teaching position is to be reproduced together with the position and the posture, information reproducing the state of the arm (for example, parameters of movable portions of the entire arm (angles of joints and the like)) is included in the teaching information. In a configuration in which at least the position of the manipulation target object may be reproduced, the minimum information to be provided to the arm for disposing the manipulation target object at the position may become the teaching information. For example, in a case in which the position of the manipulation target object is designated, in a configuration in which the conditions of the arm for moving the manipulation target object to the position are specified, the position of the manipulation target object may become the teaching information. One or a combination of a plurality of parameters which may define the state of the arm may become the teaching information.

For a configuration in which the teaching position is defined as a position relative to the reference target object, it is possible to adopt various definitions other than that of the embodiment. For example, a position in a specific relationship (a specific distance, being parallel, being perpendicular, a specific angle, or the like) with respect to a specific part (a surface, a side, or the like) of the reference target object may be defined as the teaching position.

The input reception unit may be capable of receiving the input of a position relative to the reference target object, and other than the configuration in which a numerical value is input as in the embodiment, various configurations may be adopted. For example, it is possible to execute input which changes the position or the posture of a three-dimensional model of the manipulation target object on the screen, and a configuration in which a relative position is specified at the stage at which the input is confirmed or the like may be adopted.

Furthermore, the teaching device 50 may be configured to acquire an image in which at least a portion of the background is removed excluding the manipulation target object and the teaching position using the function of the image acquisition unit 51. In other words, the manipulation target object and the teaching position (the reference target object in a case in which the reference target object is used) which are necessary for the teaching may be included in the captured images of the cameras 30a and 30b. When an image of an object which is different from the manipulation target object and the teaching position is included, for example, time is necessary for the template matching and the acquisition of the difference between the current position and the teaching position, and there is a case in which these processes are difficult.

Therefore, if a configuration is adopted in which the background is removed from the image, it is possible to realize an increase in the speed and a reduction in the difficulty of the processes relating to the teaching. The removal of the background may be carried out using various methods, for example, it is possible to realize the removal of the background using processes such as capturing images in which the manipulation target object and the reference target object are not present using the cameras 30a and 30b, comparing these images with images in which the manipulation target object and the reference target object are present, and correcting the gradation values of the pixels of portions at which there is no change to a fixed value. In a case in which the removal of the background is performed, the images of the cameras 30a and 30b attain a state such as that illustrated on the display portions $B_8$ and $B_9$ of FIG. 4 (if the removal of the background is not performed, the background may be included in the images illustrated on the display portions $B_8$ and $B_9$).

The teaching device 50 may be configured to control the arm so as to align the manipulation target object in the image with the target image which is present at the teaching position using the function of the movement control unit 53. In other words, for the method adopted when performing the visual servo, the method is not limited to a configuration in which the position and the posture are calculated in various coordinate systems based on the images as described above and the target is approached, and a configuration may be adopted in which the target is approached through the comparison of the images.

Figure 9:
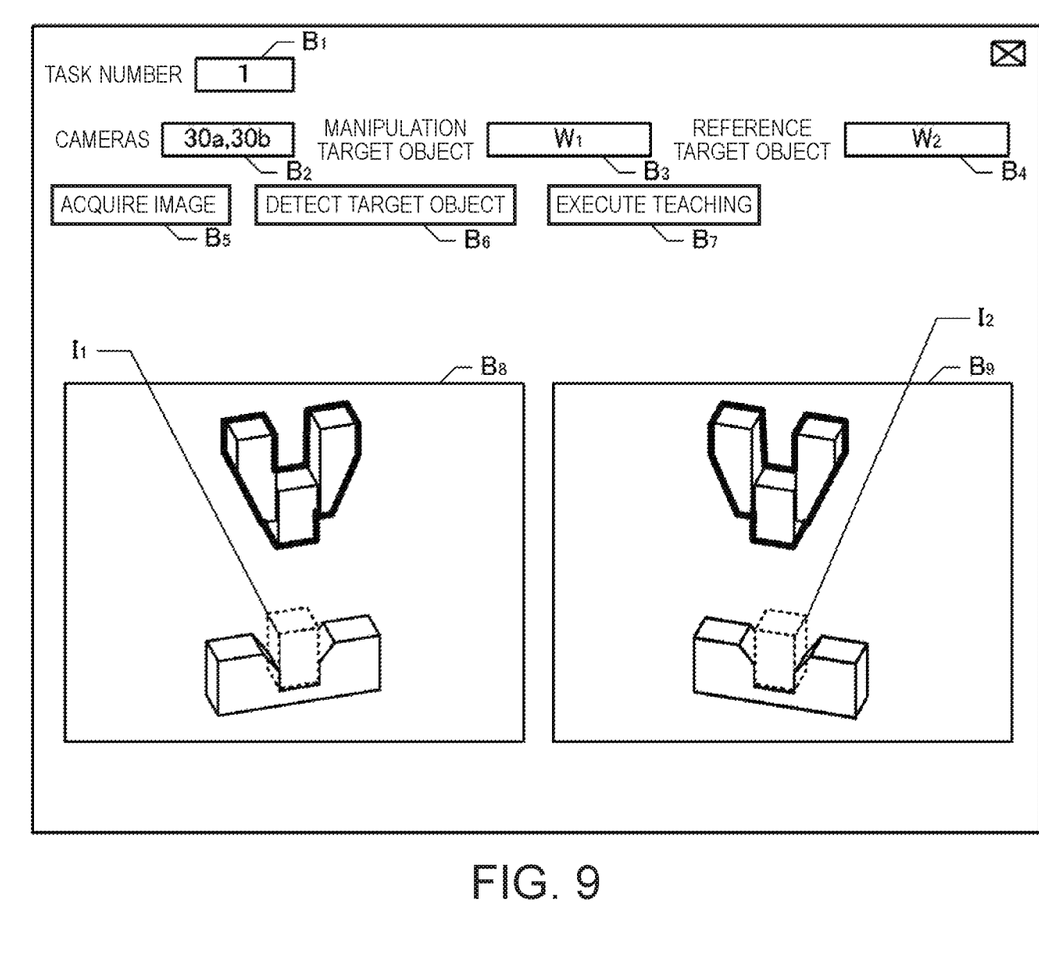
FIG. 9 is a diagram illustrating an example of a user interface.

FIG. 9 is an example of the user interface in a configuration in which a target image is set. Similarly, as illustrated in FIG. 9, target images $I_1$ and $I_2$ are overlaid on the images which are captured by the cameras 30a and 30b. In this state, the teaching device 50 executes control by the robot control device 40 such that the images of the manipulation target object $W_1$ overlap the target images. According to this configuration, it is possible to move the manipulation target object $W_1$ to the teaching position using a simple process. The target image may be created using various methods, for example, a configuration in which the user interface is configured such that the user is capable of moving the three-dimensional model of the manipulation target object $W_1$ to an arbitrary position and posture on the display, or the like may be adopted. In this configuration, if the three-dimensional model of the manipulation target object $W_1$ is disposed at the teaching position, it becomes possible to define the position and the posture of the target image.

The entire disclosure of Japanese Patent Application No. 2017-064541, filed Mar. 29, 2017 is expressly incorporated by reference herein.

What is claimed is:

1. A teaching device comprising:
   a processor that is configured to execute computer-executable instructions so as to teach a robot, and
   a camera configured to capture an image,
   wherein the processor is configured to:
   acquire the image from the camera, the image including a manipulation target object, a reference target object, and a teaching position of the manipulation target object, the manipulation target object being picked up and moved by a gripper on an arm of a robot to a space on the reference target object, and the teaching position of the manipulation target object being defined by a position relative to the reference target object;
   determine a center of gravity of the manipulation target object and determine a position and posture of the center of gravity;
   compare the position and posture of the center of gravity of the manipulation target object to a position and posture of the teaching position;
   control the arm to move the manipulation target object in the image to the position and posture of the teaching position; and
   acquire a state of the arm in a state in which the manipulation target object in the image is present at the teaching position as teaching information.

2. The teaching device according to claim 1, further comprising:
   an input reception unit which receives an input of a position relative to the reference target object,
   wherein the movement control unit acquires a position of the manipulation target object relative to the reference target object based on the image of the manipulation target object and the reference target object and controls the arm such that the relative position becomes the teaching position.

3. The teaching device according to claim 1,
   wherein the movement control unit detects the reference target object based on the image and causes a display to display the image in which the reference target object is emphasized.

4. The teaching device according to claim 1,
   wherein the movement control unit detects the manipulation target object based on the image and causes a display to display the image in which the manipulation target object is emphasized.

5. The teaching device according to claim 1,
   wherein the image acquisition unit acquires the image in which at least a portion of a background is removed excluding the manipulation target object and the teaching position.

6. The teaching device according to claim 1,
   wherein the movement control unit controls the arm to align the manipulation target object in the image with a target image which is present at the teaching position.

7. A teaching method which teaches a robot, comprising:
   acquiring an image from a camera, the image including a manipulation target object, a reference target object, and a teaching position of the manipulation target object, the manipulation target object being picked up and moved by a gripper on an arm of a robot to a space on the reference target object, and the teaching position of the manipulation target object being defined by a position relative to the reference target object;
   determining a center of gravity of the manipulation target object;
   determining a position and posture of the center of gravity;
   comparing the position and posture of the center of gravity of the manipulation target object to a position and posture of the teaching position
   controlling the arm to move the manipulation target object in the image to the position and posture of the teaching position; and
   acquiring a state of the arm in a state in which the manipulation target object in the image is present at the teaching position as teaching information.

* * * * *